2,829,988

PROCESS FOR FRACTIONATING STARCH INTO COMPONENTS WITH BRANCHED AND LINEAR CHAINS

Willem Christiaan Bus, The Hague, Johannes Muetgeert, Rotterdam, and Pieter Hiemstra, Veendam, Netherlands, assignors to Cooperatieve Verkoop- en Productievereniging van Aardappelmeel en Derivaten "Avebe" G. A., Veendam, Netherlands, a corporation of the Netherlands No Drawing. Application May 11, 1954
Serial No. 429,104

Claims priority, application Netherlands May 15, 1953

6 Claims. (Cl. 127—71)

This is a continuation-in-part of our U. S. patent application Serial No. 325,698, filed on December 12, 1952, relating to a process for fractionating starch into components with linear chains (amylose) and branched chains (amylopectin) according to which the starch is dissolved in an aqueous solution of at least one salt of the class consisting of magnesium sulphate, ammonium sulphate and sodium sulphate or of a mixture of two or three of these salts at elevated temperature and this solution is slowly cooled down. The amylose precipitates on cooling and is separated from the mother liquor e. g. by means of a centrifuge; on further cooling the amylopectin precipitates, which can also easily be separated from the mother liquor.

In order to prevent the amylopectin from precipitating during the centrifugation of the amylose the temperature of the liquid during the separation must be kept constant rather accurately, which causes difficulties in actual practice if this temperature is considerably higher than the room temperature. However, if the temperature decreases during the separation of amylose and mother liquor, part of the amylopectin is precipitated, which is separated with the amylose.

This difficulty can be obviated by working with a less concentrated salt solution as a result of which only the amylose precipitates at room temperature and the amylopectin only precipitates by cooling to temperatures of 8–10° C.; however, the cooling of relatively large quantities of liquids involves considerable expenses.

We have now found that these practical difficulties can almost entirely be prevented by working with a concentration of the salt in the solution sufficient to precipitate the amylose at a temperature of more than 10° C. without precipitating the amylopectin and, after the separation of the amylose from the mother liquor at room temperature, increasing the salt concentration of the mother liquor to such an extent that the amylopectin precipitates without any further cooling.

It should be taken into consideration that the precipitation of amylose and amylopectin from the solution is not only dependent upon the salt concentration and the temperature, but that other factors such as e. g. the viscosity of the solution, the starch concentration, the gravitational field of the centrifuge and the like have some influence as well, and that also the period of time lapsing between the moment the room temperature is reached and the moment of centrifuging, has a considerable influence.

During dissolving at temperatures above 120° C. a reducing substance which is stable in an aqueous medium at this temperature can advantageously be added to this in the way as described in the U. S. patent application Serial No. 325,698.

Preferably starch is dissolved in a relatively concentrated salt solution, which is diluted before separation of the amylose and the mother liquor, increasing the salt concentration of the mother liquor after this separation in order to precipitate the amylopectin, followed by separation of the amylopectin, because the precipitate of amylose, formed in a more concentrated salt solution, is more easily separated from the mother liquor than a precipitate, formed in a less concentrated salt solution. For instance starch is dissolved at a temperature of 160° C. in a solution having a concentration of between 25 and 30% of $MgSO_4.7$ aq. by weight. This solution is cooled at 70° C. for half an hour, and then diluted with water until the salt concentration is between 18 and 25% at which concentrations amylopectin precipitates hardly or not at all on further cooling to room temperature. After separation of the amylose at room temperature, the concentration of $MgSO_4.7$ aq. is increased to at least 25%, preferably to between 26 and 28% by weight in order to precipitate the amylopectin.

Preferably the concentration during the separation of amylose should be 20–23% by weight of $MgSO_4.7$ aq.

From the following table it is apparent that the time required for the separation of the amylose depends on the concentration of $MgSO_4$; the temperature during the separation was approx. 18° C. The concentration of $MgSO_4.7$ aq. during the separation is indicated in the first column; the time elapsing before the centrifugation took place for the first time is given in column II; columns III and IV show the percentage of amylose separated and its purity; columns V and VI show the percentage of amylose separated and its purity after a further waiting-period of the same time as indicated in column II and columns VII and VIII show the quantity of amylopectin and its purity, separated out after increasing the salt concentration to 28%. The starch content of the solutions amounted to 5% in all the tests.

Table

| Percent by wt. $MgSO_4.7$ aq. | Waiting period, hours | Percent amylose on amylose | Purity | Percent amylose on amylose | Purity | Percent amylopectin on amylopectin | Purity |
|---|---|---|---|---|---|---|---|
| 20 | 1 | 30 | 100 | 30 | 100 | 108 | 90 |
| 20 | 3 | 40 | 100 | 30 | 90 | 109 | 90 |
| 20 | 6 | 40 | 100 | 50 | 60 | 108 | 89 |
| 21 | 3 | 40 | 100 | 20 | 80 | 106 | 89 |
| 21 | 6 | 50 | 100 | 60 | 60 | 105 | 90 |
| 22 | 1 | 75 | 100 | 30 | 60 | 90 | 100 |
| 22 | 2½ | 90 | 100 | 30 | 20 | 92 | 100 |
| 22 | 3½ | 120 | 75 | 20 | 50 | 80 | 100 |
| 23 | 1 | 85 | 100 | 40 | 50 | 90 | 100 |

It should be taken into consideration that the analyzing method employed for determining the purity especially if the amylose has been considerably polluted with amylopectin does not give accurate results.

It is noted that throughout the specification the effective amounts and ranges of magnesium sulfate have been expressed in terms of the heptahydrate $MgSO_4.7H_2O$ (molecular weight 246.4). Therefore, in terms of anhydrous magnesium sulfate (molecular weight 120.4) the amount employed is about half the values set forth for the heptahydrate.

The effective ranges of concentration of sodium sulfate and ammonium sulfate for use according to this invention are the same as those set forth for magnesium sulfate when the latter are converted to values based on the amount of anhydrous magnesium sulfate.

What we claim is:

1. The process of fractionating starch into its amylose and amylopectin fractions which comprises effecting a solution of from about 3% to about 20% by weight of starch, at elevated temperature and elevated pressure, in an aqueous solution having more than 5% of at least one salt of the class consisting of magnesium sulphate, ammonium sulphate and sodium sulphate, cooling the solution to effect precipitation of the amylose fraction only, separating from the amylose fraction, increasing the salt concentration of the solution remaining after removal of the amylose fraction substantially without further cooling to a sufficiently high concentration to effect precipitation of the amylopectin fraction and separating the amylopectin fraction, said first salt concentration being insufficiently high to cause precipitation of amylopectin in said aqueous solution at a temperature above 10° C., said last salt concentration being sufficiently high to cause precipitation of amylopectin in said aqueous solution at a temperature above 10° C.

2. Process for fractionating starch, comprising dissolving from 3% to about 20% by weight of starch by heating at an elevated temperature under pressure in a concentrated aqueous solution of at least one salt of the class consisting of magnesium sulfate, ammonium sulfate and sodium sulfate, diluting the solution to decrease the concentration of the salt therein and prevent precipitation of amylopectin at temperatures above 10° C., cooling the diluted solution to temperatures above 10° C. to precipitate amylose, separating the precipitated amylose from the remaining solution, increasing the salt concentration of the solution to render amylopectin insoluble therein above 10° C., precipitating the amylopectin, and separating the amylopectin from the solution, said concentrated aqueous solution containing an amount of salt above the level at which, at temperatures above 10° C., the amylose precipitates but the amylopectin remains in solution.

3. Process according to claim 2 in which about 5% of starch is dissolved in an aqueous solution of between 25 and 30% by weight of MgSO$_4$.7 aq., the solution is diluted to a concentration of between 18-25% by weight of MgSO$_4$.7 aq. for separating the amylose from the solution, and the salt concentration of the solution is increased to at least 25% by weight of MgSO$_4$.7 aq. for precipitating the amylopectin.

4. Process according to claim 2 in which about 5% of starch is dissolved in an aqueous solution of between 25 and 30% by weight of MgSO$_4$.7 aq., the solution is diluted to a concentration of between 20-23% by weight of MgSO$_4$.7 aq. for separating the amylose from the solution, and the concentration of the salt in the solution is thereafter increased to 26-28% by weight of MgSO$_4$.7 aq. for precipitating the amylopectin.

5. Process for fractionating starch, comprising dissolving about 5% by weight of starch by heating at an elevated temperature under pressure in an aqueous solution having from about 12.5 to about 15% of at least one salt of the class consisting of magnesium sulfate, ammonium sulfate and sodium sulfate, diluting the solution to bring the salt concentration therein to from about 10 to about 11.5%, cooling the diluted solution to temperatures above 10° C. to precipitate amylose, separating the precipitated amylose from the solution, increasing the salt concentration of the solution to from about 13 to about 14% to render amylopectin insoluble therein above 10° C., precipitating the amylopectin and separating the amylopectin from the solution.

6. The process of fractionating starch into its amylose and amylopectin fractions which comprises effecting a solution of starch at elevated temperatures and at elevated pressure in an aqueous solution of more than 5% of at least one salt of the class consisting of magnesium sulfate, sodium sulfate and ammonium sulfate, cooling the solution to a temperature at which the amylose precipitates but which temperature is sufficiently high that the amylopectin remains in solution, separating the amylose fraction, increasing the salt concentration of the solution remaining after removal of the amylose fraction substantially without further cooling to a sufficiently high concentration to effect precipitation of the amylopectin fraction, and separating the amylopectin fraction, said first salt concentration being insufficiently high to cause separation of amylopectin at the amylose precipitating temperature.

References Cited in the file of this patent

UNITED STATES PATENTS

| | | |
|---|---|---|
| 2,014,799 | Fuller | Sept. 17, 1935 |
| 2,515,095 | Schoch | July 11, 1950 |
| 2,515,096 | Schoch | July 11, 1950 |

FOREIGN PATENTS

| | | |
|---|---|---|
| 5,844 | Great Britain | of 1896 |
| 590,750 | Great Britain | July 28, 1947 |

OTHER REFERENCES

Journal Textile Institute, January 1948, page A-60.

U. S. DEPARTMENT OF COMMERCE
PATENT OFFICE

CERTIFICATE OF CORRECTION

Patent No. 2,829,988                           April 8, 1958

Willem Christiaan Bus et al.

It is hereby certified that error appears in the printed specification of the above numbered patent requiring correction and that the said Letters Patent should read as corrected below.

Column 3, line 6, after "separating" strike out "from".

Signed and sealed this 20th day of May 1958.

(SEAL)
Attest:
KARL H. AXLINE
Attesting Officer

ROBERT C. WATSON
Commissioner of Patents